Aug. 19, 1941.   H. E. BATTERMAN   2,253,319
PRODUCTION OF ANIMAL FEED PRODUCTS
Filed July 7, 1938
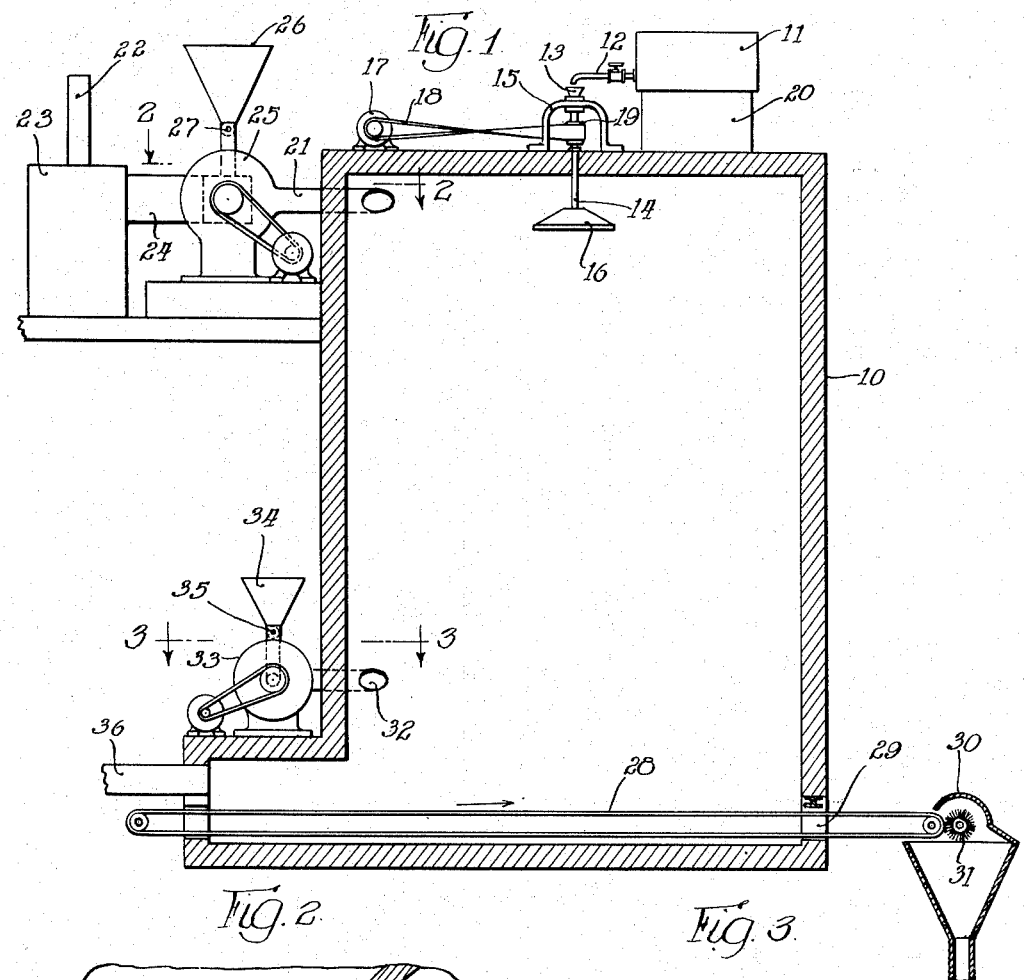
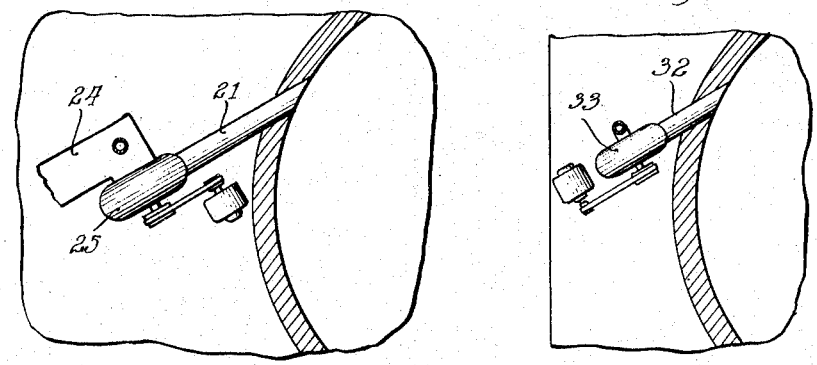
INVENTOR.
Herman E Batterman,
BY Cromwell, Greist & Warden.
ATTORNEYS.

Patented Aug. 19, 1941

2,253,319

UNITED STATES PATENT OFFICE 2,253,319

PRODUCTION OF ANIMAL FEED PRODUCTS

Herman E. Batterman, Chicago, Ill., assignor to Dry Molasses Feed Co., Chicago, Ill.

Application July 7, 1938, Serial No. 217,958

2 Claims. (Cl. 99—6)

The present invention relates to the production of a molasses feed product for livestock, and has particular reference to an improved method of producing a molasses feed concentrate in which there is combined with dried discrete particles of molasses a carrier by which adequate distribution of the molasses in the feed is assured and the feed may be subjected to the usual handling conditions without difficulty.

A principal object of the invention is the provision of a method for combining molasses with animal feed in a simple, economical and highly satisfactory manner, the improved method involving spray-drying the molasses in the form of finely divided particles and depositing the dry plastic particles of molasses upon a cooled surface in admixture with dried particles of the feed with which it is desired to combine the molasses, the feed particles being introduced into the process from a different source than the molasses.

An additional object of the invention is the provision of a molasses feed of the type described in which small particles of the feed product with which it is desired to combine the molasses are incorporated separately in a gaseous medium in which the molasses in the form of finely divided particles are undergoing a drying operation, the separately introduced particles being deposited from the gas in distributed condition.

Another object of the invention is the combination of molasses with feed by blowing from separate sources finely divided particles of the two materials together while the molasses particles are undergoing drying.

Still another object is the production of a livestock feed by providing an upper heating zone and a lower cooled zone through which separately supplied particles are passed successively and deposited in distributed condition to be continuously withdrawn.

A further object of the invention is the incorporation of finely divided particles of molasses in a spiral stream of a drying gas and contacting the particles with comminuted particles of feed material supplied from a different source in distributed condition.

A further object of the invention is the incorporation in a drying gas of finely divided particles of molasses, the gas being at an elevated temperature, contacting the molasses laden gas with particles of a feed product with which it is desired to combine the molasses, and cooling the material as it is deposited from the gas.

These and other objects of the invention will be observed upon a consideration of the following description of a preferred embodiment of the invention and by reference to the accompanying drawing, in which Fig. 1 is a vertical view, partly in section, of apparatus suitable for practicing the invention;

Fig. 2 is a fragmentary sectional view taken along line 2—2 of Fig. 1 showing the construction and arrangement of a feed-blowing apparatus such as shown in Fig. 1; and Fig. 3 is a fragmentary sectional view taken along line 3—3 of Fig. 1, showing the arrangement of a cold air blowing device.

In the production of animal feeds it has been recognized as desirable to incorporate in the feed varying quantities of molasses. This material increases the palatability of the feed and has of itself a desirable food value. Mixing of the molasses with the feed is difficult due to their viscous, sticky nature. Efforts have been made to avoid the difficulties encountered in mixing liquid molasses with feed products by combining the two in the presence of additional water, the combined mixture then being spray dried. In accordance with the present invention there is provided an improved method of combining the molasses with the feed product.

In carrying out the process of the present invention there is provided a drying tower or chamber indicated generally at 10. On the top of the drying tower 10 is shown a molasses reservoir 11 having a discharge spout 12 positioned adjacent the funnel-shaped upper end 13 of a downwardly extending conduit (not shown) which passes through the hollow rotatable shaft 14. A bracket 15 may be employed for providing an upper bearing for the shaft 14.

The shaft 14 extends downwardly through the top of the tower 10 and is provided on its lower portion with a rotatable spray-projecting head 16, the construction of which is conventional. Rotation is imparted to the shaft 14 and the spray-projecting head 16 by any suitable means such as the motor 17 and belt 18, the latter passing about pulley 19 on the shaft 14.

The molasses in reservoir 11, which may be maintained at the desired elevated temperature by means of a heater shown at 20, passes through the inner tube within hollow shaft 14 and is projected outwardly by the atomizing device 16.

During operation of the molasses atomizing device there is blown into the drying tower 10 a blast of hot air from the duct 21. It will be noted that the duct 21 projects the hot air into the tower tangentially, and as a result of this directional discharge of the air the gases within the drying tower have a general spiral motion around and downwardly within the tower.

The stack 22 serves a heater 23 for the air used in the process. The air which is blown through discharge duct 21 is drawn from the atmosphere, heated to the desired temperature in heater 23, and then being drawn through duct 24 by the action of a fan 25. From the latter the heated air is discharged into duct 21. It is preferred that the air entering the tower have a temperature of the order of 400° to 450° F., at which temperature the air contacts the molasses spray discharging from the centrifugal spray head 16.

As the hot air and finely divided particles of molasses pass spirally down through the drying tower the moisture content of the molasses particles is reduced to the extent necessary to provide discrete particles in the finished product.

Above the conduit 24 adjacent the fan 25 is mounted a hopper 26, which is filled with commuted particles of the feed product with which it is desired to incorporate the molasses. This feed product may be comminuted alfalfa in admixture with a small percentage of an inorganic salt such as calcium carbonate. Preferably comminuted particles of an organic feed material are used, at least in part, although this is unnecessary. A rotary measuring device indicated at 27 is positioned in the bottom of the hopper 26 and controls the amount of the comminuted feed material which passes downwardly out of the hopper. This comminuted feed material passes into the conduit 24 on the intake side of fan 25 and is distributed in the hot air entering the tower 10. In this manner the comminuted feed material is mixed with the particles of molasses during the drying operation. Thus, the mixing of the comminuted feed particles and the particles of molasses and the drying of the latter simultaneously are effected in a gaseous medium, the resulting mixture falling downwardly in the tower 10 and being deposited in distributed condition upon the continuous belt 28, which operates in the bottom of the tower. The belt 28 conveys the combined material through the opening 29 in the side of the tower 10 and into a hopper 30 where it is removed from the conveyor by the brush 31. From the hopper 30 the material falls downwardly and is packaged in suitable moistureproof containers.

In a preferred embodiment of the invention there is discharged into the tower 10 adjacent the bottom thereof a blast of cool air as through the conduit 32. Fan 33 blows air through the conduit 32 at atmospheric temperature. It will be noted that the conduit 32 is substantially parallel to conduit 21, thereby maintaining the directional flow of the air in the tower. In many cases it will be desirable to incorporate further quantities of comminuted feed particles with the particles of molasses by blowing the feed particles into the tower along with the cold air entering through conduit 32. These additional quantities of feed particles may be introduced into the air stream of conduit 32 from a hopper 34. The hopper 34 has a metering gear 35 adjacent its bottom and the latter determines the amount of feed entering the air fan or blower 33 for conveyance into the tower through conduit 32.

The action of the cold air entering through the conduit 32 is to at least partially harden the dried particles of molasses in the presence of the feed particles with which the molasses particles are incorporated. As the hot air from conduit 21 passes downwardly in the tower it exercises an evaporating effect upon the water content of the molasses particles, thereby reducing the temperature of the air from about 400° or about 450° F. to about 150° F. At the latter temperature the molasses particles may be somewhat thermoplastic, and the cold air through conduit 32 insures that the molasses particles conveyed from the tower are sufficiently non-tacky to inhibit caking of the product with its then moisture content and to prevent manufacturing difficulties.

To provide for the maintenance of an equalized pressure in the tower there preferably is connected to the tower adjacent the bottom thereof a conduit 36 leading to an exhaust fan.

The unitary drying and gaseous mixing operation described has a great many advantages over the procedures which have been used heretofore in making hygroscopic or deliquescent feed products. The stability of mixed feed containing molasses particles is a point of particular concern, and in accordance with the process described herein the resulting product is of such stability as to withstand adequately all of the conditions normally experienced in storing, mixing and handling the feed.

A feature of the process is that the simultaneous drying and mixing operation may be effected with a smaller quantity of the feed particles than may be desired in the final product. That is, there is produced a molasses concentrate which is highly desirable in that it may be produced and marketed as a concentrate for admixture with the main bulk of feed by the user or by small merchants who are not equipped with the large and expensive machinery to do the mixing in all degrees of weather.

Dried molasses powder is quite hygroscopic or deliquescent and will cake if exposed to the atmosphere a short period of time. When produced in the manner described herein and mixed with a relatively small quantity of non-hydroscopic particles the concentrate may be maintained adequately for extended periods under normal conditions of handling and mixing.

One desirable mixture for combination with the molasses solids consists of 20 per cent alfalfa meal and 10 per cent ground calcium carbonate, these percentages being based upon 70 per cent molasses solids. The particular composition of the molasses of course can vary widely. Ordinarily it is preferred to use cheaper grades of molasses such as "Black Strap," such products being the mother liquor from sugar crystallization operation. The particular feed particles which are combined with the molasses product during the drying operation likewise may be varied widely. Comminuted cereal products may be used for admixture with the molasses particles, as may the various mineral feeds commonly used.

In the drying and mixing operation described there are provided an upper drying zone and a lower cooled zone through which continuously travels a cooled conveyor surface, the cooling zone and surface reduce the temperature of the dried, plastic particles of molasses enough to render them sufficiently non-tacky to be handled with ease. It is important that the particles of feed be supplied from a separate source so as not to be impregnated with the molasses. A certain amount of adhesion between the molasses particles and the particles of feed occurs during the process, but this adhesion is different from the impregnation effect obtained by drying a feed impregnated molasses solution. The combined particles form a free flowing mixture which is highly desirable.

It will be found advantageous in many cases to distribute feed particles on the belt 28 so that as the belt carries the particles through the drying tower there will be deposited upon the feed particles the finely divided particles of molasses which are undergoing drying in the tower 10. Also, cooling and embrittlement of the molasses particles may be continued after the conveyor emerges from the drying tower. In some cases it will be desired to further cool the conveyor surface upon which the particles are deposited, as by a fan operating upon the entering or return portion of the conveyor. These are illustrative of the variations in technique which may be employed for producing the combination of the molasses product and the feed particles in a continuous operation as a part of the drying operation for the former. The particular technique selected will determine the advantages which may be secured thereby. As the particles are somewhat thermoplastic even after losing their moisture content, there is obtained a desirable commingled adherence between the feed particles and the molasses particles even though the latter are dehydrated. The presence of the feed particles combined in the manner described also reduces the tendency of the molasses particles to stick to the walls of the drying tower during the drying operation. Separate introduction of the feed particles and the molasses into the drying chamber permits the use of pressure atomizing nozzles in the drying equipment, since the nozzles will not be abraded or clogged up, as in the case of a liquid mixture of the materials.

These and many other advantages will be obtained by the simultaneous introduction into the drying tower of the deliquescent or hygroscopic molasses particles undergoing drying and the non-deliquescent particles of feed products with which it is desired to mix the molasses particles and to produce a feed or feed concentrate rapidly and economically. Adherence of the particles of molasses and the particles of the feed is obtained while the particles of molasses are dehydrated but still warm enough to have adequate adhesive characteristics, and at the same time the resulting mixture is produced without troublesome caking which otherwise would occur.

The various changes which may be made in the procedure described are intended to be included in the appended claims.

I claim:

1. The process of producing a feed product of the type described, which consists in producing a current of hot air, and simultaneously introducing into such current from separate sources a shower of wet molasses particles and a shower of finely comminuted non-hygroscopic feed particles, whereby to intimately mix said particles and dry the molasses particles on the feed particles while all of the particles are still in suspension.

2. The process of producing a feed product of the type described, which consists in producing a current of hot air, simultaneously introducing into such current from separate sources a shower of wet molasses particles and a shower of finely comminuted non-hygroscopic feed particles, whereby to intimately mix said particles and dry the molasses particles on the feed particles while all of the particles are still in suspension, producing a second current of cooler air, and introducing into the second current said mixed particles while the latter are still in suspension.

HERMAN E. BATTERMAN.